April 26, 1960 W. H. MIDDENDORF 2,934,620

CIRCUIT BREAKER

Filed Jan. 4, 1957 5 Sheets-Sheet 1

INVENTOR.

William H. Middendorf

BY

Wood, Herron & Evans

ATTORNEYS.

April 26, 1960 W. H. MIDDENDORF 2,934,620

CIRCUIT BREAKER

Filed Jan. 4, 1957 5 Sheets-Sheet 2

INVENTOR.

William H. Middendorf.

BY

Wood, Herron & Evans.

ATTORNEYS.

April 26, 1960 W. H. MIDDENDORF 2,934,620

CIRCUIT BREAKER

Filed Jan. 4, 1957 5 Sheets-Sheet 3

INVENTOR.
William H. Middendorf.
BY
Wood, Herron & Evans.
ATTORNEYS.

April 26, 1960 W. H. MIDDENDORF 2,934,620

CIRCUIT BREAKER

Filed Jan. 4, 1957 5 Sheets-Sheet 4

INVENTOR.

William H. Middendorf

BY

Wood, Herron & Evans.

ATTORNEYS.

April 26, 1960 W. H. MIDDENDORF 2,934,620

CIRCUIT BREAKER

Filed Jan. 4, 1957 5 Sheets-Sheet 5

INVENTOR.
William H. Middendorf.
BY
Wood, Herron & Evans
ATTORNEYS.

United States Patent Office 2,934,620

Patented Apr. 26, 1960

2,934,620

CIRCUIT BREAKER

William H. Middendorf, Covington, Ky., assignor to The Wadsworth Electric Manufacturing Company, Inc., Covington, Ky., a corporation of Kentucky Application January 4, 1957, Serial No. 632,493

25 Claims. (Cl. 200—88)

This invention relates to devices for making and breaking an electric circuit. It is directed more particularly to electric circuit breakers which are automatically operable by thermal or magnetically responsive means, or both, in consequence of predetermined or abnormal circuit overload.

An objective of this invention has been to provide a circuit breaker which is fully reliable after prolonged use and which may be manufactured and assembled more easily and at lower cost than functionally similar devices now available.

A further object of this invention has been to provide a circuit breaker mechanism which is simple to manufacture and assemble but which is adapted for two pole service with a breaker having a similar type of operating mechanism. More specifically in this respect, the object of the invention has been to provide paired circuit breakers having a common trip element which virtually instantaneously releases one breaker of the pair whenever the other is tripped through incidence of abnormal overload.

Another object of this invention has been to provide a circuit breaker which will trip reliably and dependably when a given overload occurs, but having means for adjusting or calibrating the sensitivity of the breaker without overstressing or bending the current-responsive bimetal element or any other part within the breaker.

A further object of the invention has been to provide a circuit breaker having provisions to compensate for variations in ambient temperature, whereby the device will exhibit uniform sensitivity whether installed for service in a cold environment or in an area where the prevailing temperature might be much higher. In this regard, an objective of this invention has been to provide a circuit breaker having a main thermally responsive element, a thermally responsive compensating element for effectively desensitizing the main thermally responsive element in proportion to ambient temperature increase and vice versa, and a manually operable calibrating member for altering the position of the ambient temperature compensating element to change the sensitivity of the circuit breaker at the prevailing temperature.

A still further object of this invention has been to provide a circuit breaker mechanism comprising interrelated operating parts which cooperate with one or more stationary but functionally active casing surfaces. In recent years, efforts have been made to provide circuit breakers which are adapted to be installed as pre-assemblies into circuit breaker casings constructed and arranged to hold or to locate the parts in given positions. Such constructions, however, have required the incorporation of extra moving parts or elements in the operating mechanism at extra assembly expense, in order to provide the intended cooperation of all the parts. The present invention contemplates a circuit breaker mechanism and casing combination in which the respective stationary surfaces of the casing guide and direct moving parts of the operating mechanism along or through the paths which they are intended to follow in moving from latched to unlatched position and vice versa, whereby the total number of individual parts in the unit is reduced.

A further objective has been to provide a circuit breaker which is small in over-all size but which has an operating mechanism spaced appreciably from the cooperable contacts through which a circuit is established in conjunction with a barrier which is interposed between the arc site and the operating parts but which, upon release of the circuit breaker, moves away from the arc site so that the barrier protects itself and the operating parts of the circuit breaker from damage by arcs formed upon separating of the contacts, particularly during overload.

Further objectives of the invention are to incorporate the foregoing features in a circuit breaker which is of the "trip-free" type, that is, a switch mechanism through which a circuit cannot be established manually as long as an abnormal overload exists in the electric circuit to which it is connected and to provide a circuit breaker whose magnetic element is not shunted by conductive metallic path.

The following detailed description of the drawings, which illustrate a circuit breaker constructed in embodiment of this invention, also sets forth other objectives and further advantages provided by this invention.

In the drawings:

Figure 10 shows the relationships when the breaker is latched;

Figure 11 shows the relationships momentarily after tripping and while the parts are in movement;

Figure 12 shows the relationships when the parts are at rest in unlatched position of the breaker;

Figure 13 shows the relationships as the operator begins to move the resetting handle from its tripped to its latched position;

Figure 14 shows the relationships at a time when the handle has been moved sufficiently to re-engage certain of the parts at the start of a manual relatching operation;

Figure 15 shows the relationships in an unstable position just prior to latching release from the handle and just prior to actual relatching;

Figure 16 is a view similar to Figure 10 but showing the handle position at the start of a manual unlatching operation;

Figure 17 is a view showing the relationships with the handle in position moving to unlatch or manually trip the breaker; and Figure 18 is a view similar to Figure 12 but showing the parts in static equilibrium with the breaker unlatched.

Figure 1:
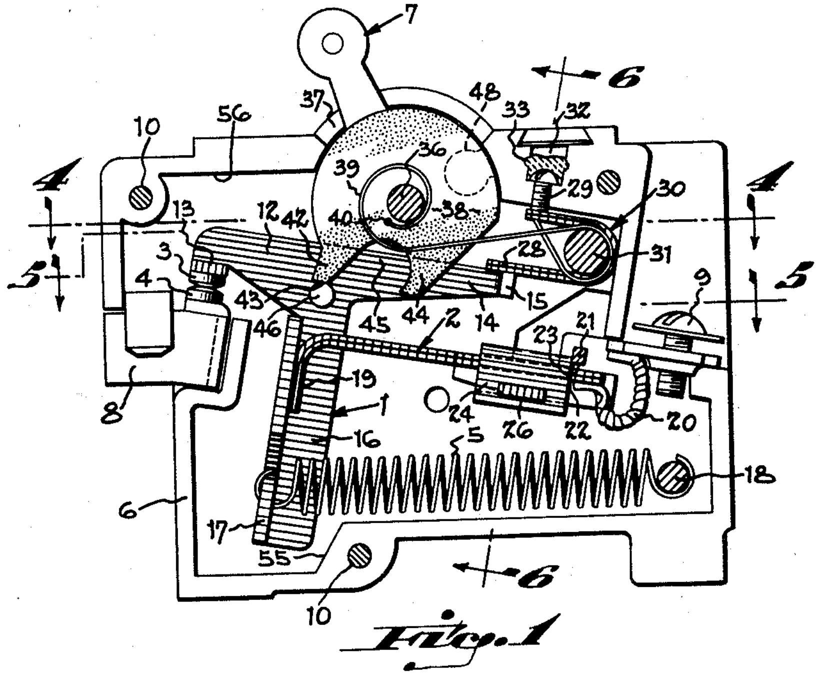
Figure 1 is a side elevation of the circuit breaker showing the operating parts in the latched or circuit-closed position.

The main parts of the circuit breaker illustrated in the drawings are a carrier illustrated generally at 1, a bimetal element 2 constituting the control element thermally responsive to overload, a pair of cooperative contacts 3 and 4, a main actuating spring 5, a case 6 having an operating handle 7, and terminals 8 and 9 which are adapted to be interconnected electrically in the circuit which is to be protected against overload by the circuit breaker. The case 6, except for guiding functions subsequently described, may be of conventional design comprising half sections molded of plastic insulating composition. The half sections mate with one another along a central meeting line (Figure 6) to form an enclosure to house the operating parts so as to keep them free from dust, to shield the exterior from arcs which occur when the contacts 3 and 4 are separated under circuit load, and to furnish bearings and supports for the handle and other members. The sections forming case 6 are provided with aligned cross holes 10 which are adapted to receive suitable screws or rivets for holding the halves together after the parts have been placed in the case.

Carrier 1 is a free body member in the form of an essentially flat piece residing adjacent one side wall of the case 6 and is made of an electrically conductive metal such as copper. This carrier, as shown, is generally of T shape and includes a forwardly extending portion 12 having an ear 13 at its extremity to which the movable contact 3 is suitably fastened or welded. The contact 3 is disposed transversely of the plane of the carrier portion 12 and preferably has a convex face which, when in engagement with stationary contact 4, provides a rocking fulcrum for the carrier.

Portion 14 of the carrier 1 extends relatively in a rearward direction and constitutes an operating arm having an ear 15 bent laterally from its plane at the extremity opposite contact 3. The leg 16 of the carrier extends downwardly from the head portions 12 and 14 and carries barrier flange 17 which extends laterally from the plane of the carrier and substantially across the housing interior.

Operating spring 5 is a tension spring having its forward end hooked through a hole in the flange 17 and its rearward end hooked around a cross piece 18, which may extend across the case interior as an integral part of it or as a separate element. The spring 5 preferably resides generally along the bottom of the case.

Bimetal 2 is mounted on the carrier 1 for movement therewith. For this purpose, in the construction shown, it is provided with a laterally bent foot portion 19 which is secured rigidly as by welding to the rear face of barrier flange 17. The main portion of the bimetal thus extends approximately parallel with but generally below the head portion 14 of the T-shaped carrier.

A flexible conductor or so-called pigtail 20 electrically interconnects the rearward endwise portion of the bimetal to the terminal 9, and since the bimetal, which itself is electrically conductive, is connected to the conductive carrier 1, the bimetal institutes a path through which current flows when the contacts 3 and 4 are engaged. Abnormal current therefore causes the bimetal to heat and warp. In the construction shown, the bimetal, when heated through overload or through increase of ambient temperature, warps in a downward direction.

Figure 6:
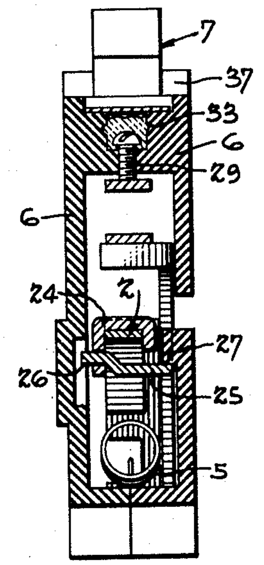
Figure 6 is a cross-sectional view taken on the line 6—6 of Figure 1.
Figure 7:
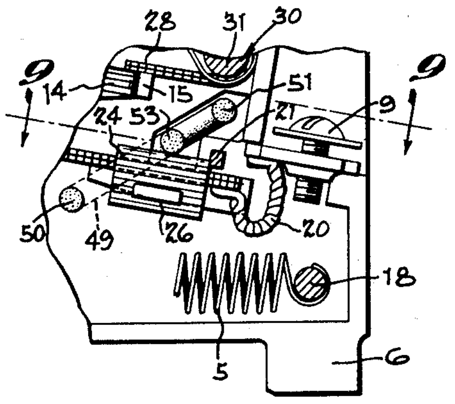
Figure 7 is a fragmentary sectional elevation similar to Figure 1 showing the breaker in closed position but subject to a trip element which is common to an adjacent circuit breaker of similar construction.
Figure 8:
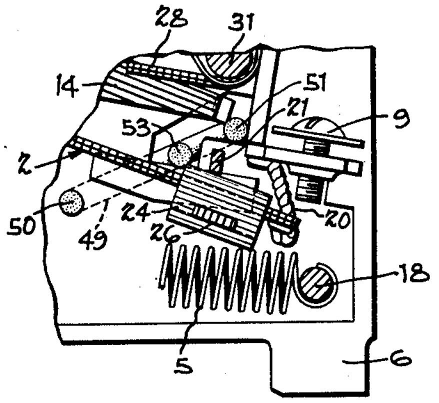
Figure 8 is a view similar to Figure 7 but showing the parts in tripped or unlatched position in consequence of tripping of the adjacent breaker.

A latch 21 engages a shoulder 22 which is provided on the rearward portion of the bimetal whereby the carrier 1 is normally restrained from movement under the influence of spring 5 when the contacts 3 and 4 are in engagement. The latch 21 preferably presents a square or relatively sharp latching edge 23, and the cooperating shoulder 22 provided on the bimetal may be struck from the bimetal or may be furnished as a part of a magnetic yoke associated with the bimetal, if magnetic as well as thermal overload protection is to be built into the circuit breaker. The latter type of mechanism is shown in the drawings, in which the magnetic overload protector is of the type disclosed and claimed in Middendorf U.S. Patent 2,716,679. This magnetic assembly comprises a U-shaped yoke 24 extending around and depending from bimetal 2, wherein the rearward end of the yoke presents shoulder 22 which is engageable with latch 21. Yoke 24 is made of magnetic material, and an armature 25 is pivotally associated with one of its arms as by means of an ear 26 extending through an aperture provided in the yoke arm beneath the bimetal. This armature projects sidewisely so as to reside beneath an abutment 27 formed on the case. When the parts occupy the position in which they are shown in Figures 1 and 6, the sidewisely projecting portion of the armature 25 is restrained against upward movement by the abutment 27, but when current corresponding to an abnormal overload traverses the bimetal, a magnetic field is established through the yoke 24 which tends to attract the magnetically responsive armature 25. However, since the armature cannot move upwardly, the bimetal 2 is attracted magnetically to move downwardly and the abutment shoulder 22 escapes the latch edge 23 of latch 21. On the other hand, if the bimetal element is traversed by an overload current, then the bimetal itself will become heated because of its internal resistance and will warp in a downward direction at its rear end, in which event abutment shoulder 22 will similarly escape the latching edge 23 of latch 21. In place of the magnetic overload release shown in the aforesaid patent, various other types of magnetic overload releases known to those skilled in this art may be employed.

Spring 5 biases the contact carrier 1 in a generally counter-clockwise direction as seen in Figure 1, the carrier tending to pivot about the fulcrum provided by the mating contacts 3 and 4. The counter-clockwise movement, however, is restrained by engagement of the tail piece 15 at the rear end of the carrier head 14 with a stop surface 28 which, when the contacts are engaged, constitutes another fulcrum about which the carrier is urged by spring 5. Surface 28 may either be formed as a stationary surface on the case 6, as an endwise portion of a calibration screw 29, or, as is shown in the drawings, as a portion of an ambient temperature compensator indicated generally at 30 which, in turn, is served by a calibration screw 29.

The ambient temperature compensator 30 comprises a U-shaped bimetal member which is supported at the bight of the U, the bight being supported on a cross piece 31 formed as a part of the case. The lower arm of the U projects forwardly, thereby presenting the stop surface 28, while the upper arm of the U is engaged by the inner end of calibrating screw 29. Screw 29 is received in a threaded bore formed in the case 6; if the bore is located on the meeting line of the case halves, as shown, then, to avoid the necessity of aligning screw threads formed on half bores, the half bore portion in only one of the case halves may carry threads molded integrally therewith while the half bore in the other half of the case may be smooth and dimensioned to fit the screw snugly.

The head of the calibrating screw 29 is received in a recess 32 which has an internal groove 33. When the screw 29 has been rotated after assembly of the breaker to bring the parts to the desired sensitivity, the recess 32 is filled with an air-hardening cement which becomes keyed against escape in the annular recess 33 and the screw head cross slot. The calibration, once set, is thereby fixed against inadvertent movement or tampering.

Under normal ambient temperature conditions, the face of bimetal 2 is spaced from the lower face of latch 21, and compensating bimetal 30 is constructed to warp under ambient temperature increase by an amount corresponding to the warp which occurs in bimetal 2, but in an opposite direction so that the adjustment of the parts as set initially through rotation of the screw 29 at one direction or another will be maintained despite variations in the temperature of the atmosphere surrounding or within the breaker, that is, the point of engagement of latch 21 with shoulder 22 will be maintained. Thus, regardless of the warp in the bimetal occurring from changes in ambient temperature, the deflection required to release the latch will be constant.

The upper part of case 6 carries rockable operating handle 7 which is arranged for movement in the general plane of the carrier 1 but to one side of the carrier upon a rock shaft 36 which extends crosswise of the case cavity and is rotatably supported by the side walls thereof. The handle proper projects through a suitable slot 37 provided in the case top wall from a lower carrier controlling portion 38. The handle is biased in the forward direction, i.e. to the left as shown in Figure 1, by a torsion spring 39 having one end connected to the handle portion 38 as at 40, the body of the spring being coiled about the rock shaft 36, then reversely about the cross pin 31, with the forward end of the torsion spring bearing upwardly upon the upper arm of the temperature compensator 30 so as to bias the U-shaped temperature compensator in a generally clockwise direction against the calibration screw 29. Thus, in addition to biasing the handle in a counterclockwise direction as seen in Figure 1, the spring serves the purpose of causing the temperature compensator to follow the end of the calibration screw 29 if the calibration screw is backed away therefrom.

The internal body portion 38 of handle 7 is equipped with an unlatching finger 42 having a thrust surface 43 and a latching or camming finger 44 which are spaced from one another by a clearance throat 45. These portions cooperate with a thrust pin 46 which projects laterally from the carrier 1 in position to be engaged by unlatching and latching fingers 42 and 44 respectively. The body portion 38 of handle 7 also carries a control pin 48 which projects therefrom over the carrier 1 for cooperation therewith. This pin is seen in dotted lines in Figures 1–3 and in full lines in Figures 13–15. It is the function of the pin to guide the contact carrier so that it escapes from the camming finger 44 during relatching movement of the handle, as subsequently described.

*Common trip structure*

Figure 9:
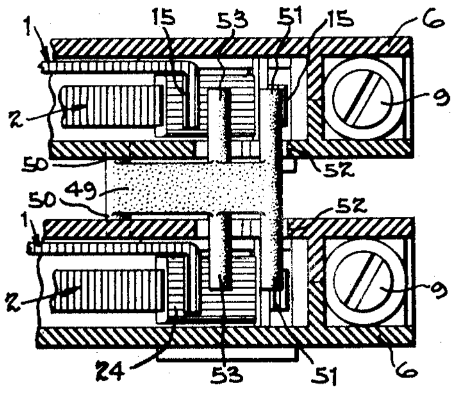
Figure 9 is a sectional plan view illustrating the trip element common to adjacent breakers, as taken on the line 9—9 of Figure 7.

It is frequently desirable or necessary to protect each leg of a two conductor circuit by individual or separately operable circuit breakers but also to have both breakers become tripped when overload conditions are such that either is tripped. The structure of the present invention lends itself conveniently to the provision of that additional facility. Two circuit breakers, each constructed as described, may be mounted in spaced adjacent relationship as shown in Figure 9, and a common trip element may be installed to cause tripping of one breaker in consequence of tripping of the other. This trip member, in accordance with the present invention, may be in the form of a T pivotally mounted on or between the breaker cases, as by stud projections 50, 50 which are located at the lower end of the T and which are received in aligned bores respectively provided in the breaker cases. Opposed laterally projecting portions 51, 51 extend respectively into the breaker cases through clearance bores 52 thereof, and these portions 51 inside the breaker case reside in the path of movement of the contact carrier tail piece 15 so as to be respectively engaged thereby when either breaker is tripped. Adjacent the laterally projecting arm portions 51, the common trip element 49 carries arms 53, 53 which also extend into the respective breaker cases. These portions, however, reside adjacent the upper surface of the bimetal (or upper surface of the magnetic yoke if such is incorporated). If desired, the actuated and actuating portions 51 and 53 may be combined as unitary lateral projections suitably configurated to clear the other parts.

When either of the arms 51 of the common trip element 49 is engaged by the moving tail piece of the contact carrier of one of the breakers in consequence to tripping of that breaker, the entire common trip member 49 is moved arcuately about the pivots 50 whereby the arms also move arcuately in a generally downward direction. The arm 53 of the breaker which did not trip bears upon the latched bimetal which it engages, causing that bimetal to move downwardly and thereby releasing that bimetal from its latch. Thus, either breaker, when tripped, automatically effects tripping of the other. The tripping of the electrically untripped breaker occurs virtually simultaneously with the release of the electrically tripped breaker, and the action is provided by a single part which is of simple construction.

*Operation of the breaker*

When the circuit breaker is in the circuit closed position, in which it is shown in Figure 1, the carrier 1 is pivotal about the engaged contacts 3 and 4. Main spring 5 holds the contacts in engagement while the tail piece 15 of the carrier exerts an upward thrust on the lower arm of the ambient temperature compensator 30. Rearward movement of the carrier under the influence of the spring is prevented through engagement of the bimetal with the latch. The thrust finger 43 of the operating handle 7 is biased against thrust pin 46 of the carrier 1 under the influence of the convolute spring 39, and the other end of that spring urges the ambient temperature compensator against the end of the calibrating screw 29. The weight or strength of torsion spring 39 is proportioned to the strength of the main spring 5 such that the downward thrust upon the carrier by the unlatching finger 42 of the handle is less than the counteractive torque upon the carrier afforded by spring 5.

Upon occurrence of an overload in the circuit extending across the terminals 8 and 9 of the circuit breaker, the current traversing the bimetal 2 causes its rearward end to move downwardly, either under the thermal influence of internal heating or magnetically through the attraction of the restrained armature upon the yoke associated with the bimetal. The latching shoulder of the bimetal thereby moves toward escape from latch 21, and if the overload is of sufficient duration or magnitude, the bimetal moves downwardly past the latching edge and becomes released therefrom.

When the bimetal is unlatched, the entire carrier assembly moves in a rearward direction. Contact 4 slides or scrapes over the surface of stationary contact 3. Thrust pin 46 moves to a position beneath the clearance throat 45 of the handle, and since the thrust surface of finger 42 no longer derives support from trust pin 46, the handle 7 rotates in counter-clockwise direction under the bias of torsion spring 39 to come to rest over the forward end of the case. This new position of the handle thereby denotes the tripped condition of the circuit breaker. The handle may be provided with "off" indicia if desired.

During rearward movement of the carrier, an upward thrust is imparted to it to move contact 3 upwardly away from the stationary contact and to move the thrust pin 46 on the carrier into the clearance throat 45 of the handle. This action may be obtained by the provision of an angulated surface 55 on the case 6 in the path of movement of the lower portion of the carrier leg 16, as shown, or by angulation of the carrier leg with respect to a case abutment, or both if desired. In any event, upon engagement of the carrier with the stationary surface, the carrier moves upwardly and comes to rest under a torque force in which the main spring 5 tends to rotate the carrier in a clockwise direction about the point of engagement of the carrier leg 16 with the stationary surface 55. This rotational force is restrained by any suitable stop means, such as by engagement of the carrier tail piece 15 with arm 51 of the common trip element which, in turn, is restrained by the case, by direct engagement of the tail piece with a stop on the case if a common stop element is not utilized, or by engagement of the ear 13 against the forward face of the handle, as desired.

The circuit breaker is now open and the parts are at rest. Although the respective phases of motion during tripping have been described sequentially, they occur as a smooth, integrated action.

Figure 2:
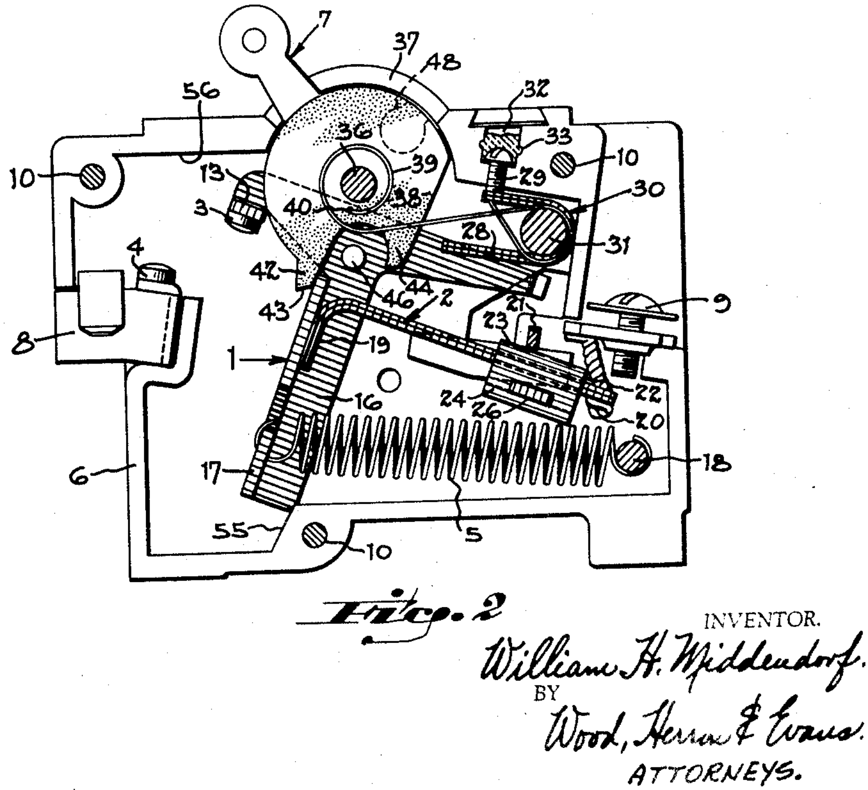
Figure 2 is a view similar to Figure 1 showing the operating parts in the unlatched, tripped, or circuit open position.
Figure 3:
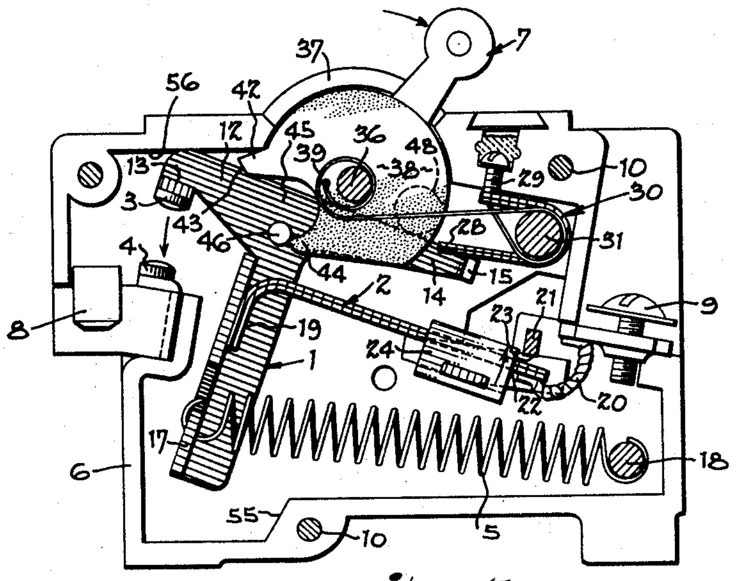
Figure 3 is a view similar to Figures 1 and 2 showing the parts in the position they occupy at an intermediate stage during manual resetting of the circuit breaker from unlatched to latched position.
Figure 4:
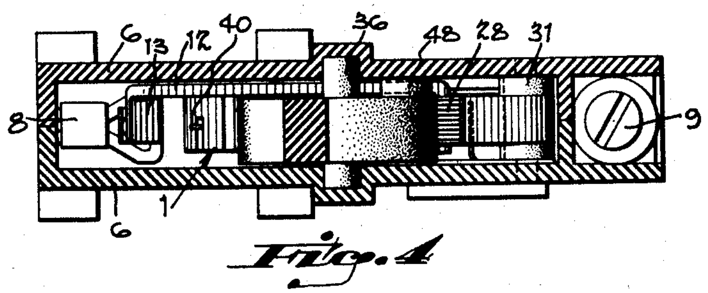
Figure 4 is a sectional plan view taken on the line 4—4 of Figure 1.
Figure 5:
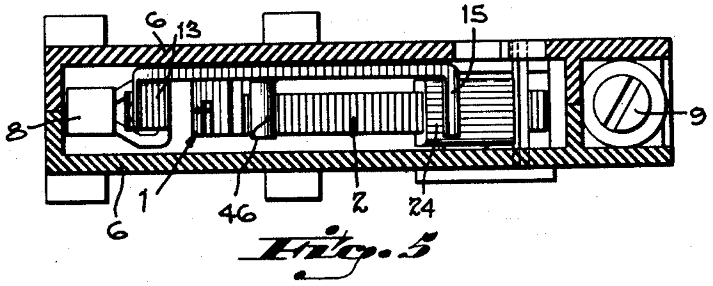
Figure 5 is a sectional plan view taken on the line 5—5 of Figure 1.
Figure 13:
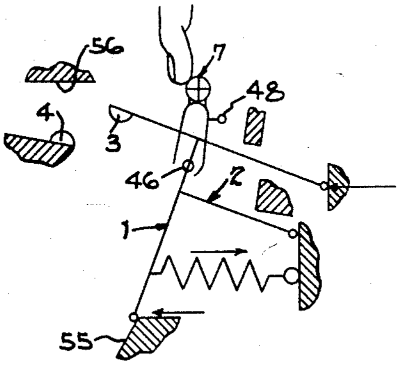
Figure 11:
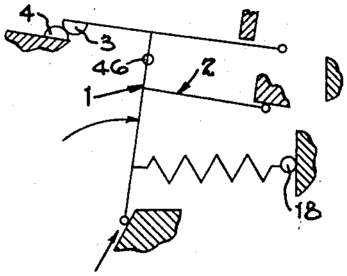
Figure 14:
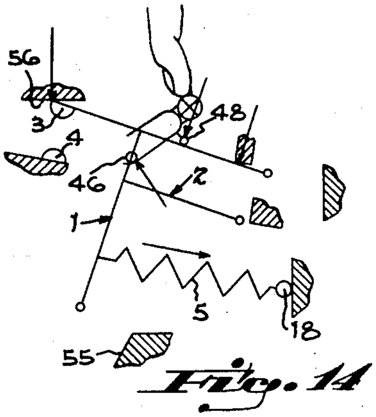
Figure 12:
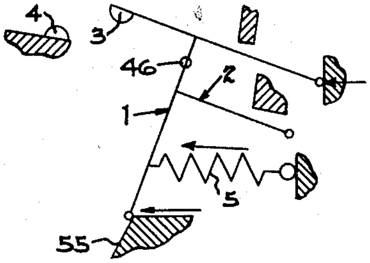
Figure 15:
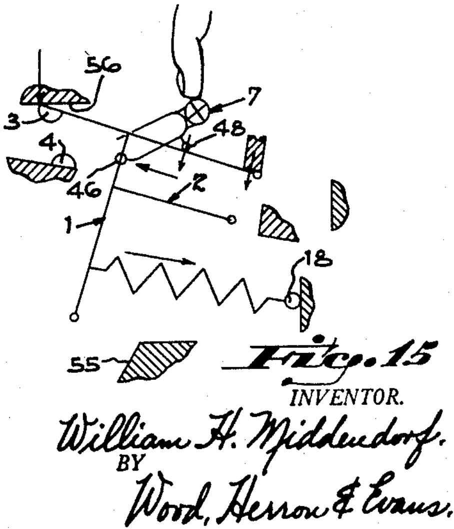
Figure 16:
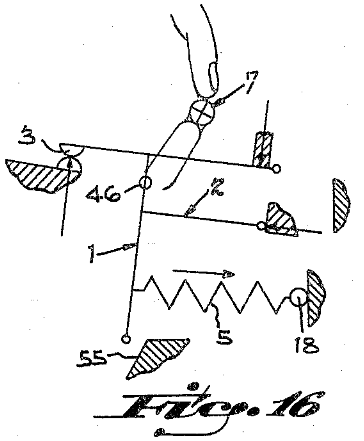
Figure 17:
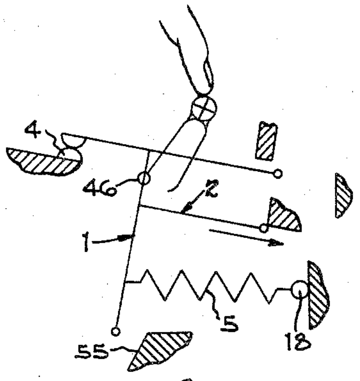
Figure 18:
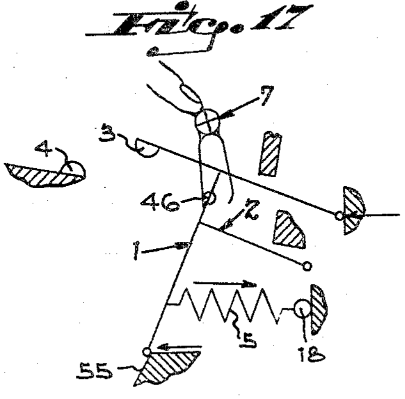

To relatch the breaker, the handle 7 is rotated rearwardly from its foremost or "tripped" position in a clockwise direction as seen in Figures 2, 3, and 13. In the initial phase of this movement, latching finger 44 of the handle moves toward the thrust pin 46 and comes into engagement with it. Further movement of the handle in the same direction causes the finger 44 to carry the thrust pin arcuately but forwardly with it so as to move the carrier in a forward, upward direction a distance sufficient to bring the shoulder 22 on the bimetal to its latched position in front of latch 21. During these movements of the handle and carrier, the control pin 48 on the handle is approaching the upper edge of the carrier, and the two reach engagement at or about the time that the upper, forward portion 12 of the carrier comes into engagement with a guide surface 56 formed on the case. This is shown in Figure 15. Further rotation of the handle in the same direction exerts a forward thrust upon the handle despite the fact that the latching finger 44 is tending to lift it. The lifting finger at the point of engagement with the thrust pin 46 at this time is in a downwardly sloping position, and pin 48 is tending to rock the carrier about the thrust pin 46. Since the movement of the forward portion 12 of the carrier in an upward direction is limited, the force components on the carrier are effective to impart a forward motion to the carrier, whence it moves over the sloping surface of the latching finger 44 sufficiently to escape the forward extremity of the same.

At the moment of escape, the carrier pivots downwardly about the tail piece 15 in engagement with the ambient temperature compensator, and the contact 3 slams downwardly at high speed through an arcuate path into engagement with the stationary contact 3. The movable contact thereafter remains pressed against the fixed contact since spring 5 biases the carrier about the fulcrum afforded by the temperature compensator.

Figure 10:
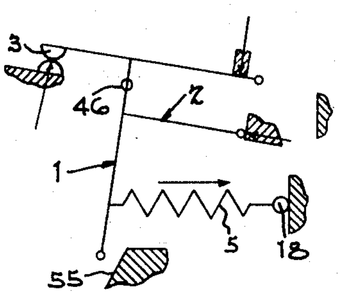
Figures 10–18 are free body force diagrams showing the reactive forces and directions of movement of the respective parts of the breaker, in which views.

The handle 7, when released after its relatching operation, swings forwardly under the influence of the torsion spring 39 until the thrust surface 43 again comes to rest against the thrust finger 46. The circuit is now closed, and the parts are restored to the relationships shown in Figures 1 and 10.

For manual tripping of the breaker, the handle 7 is urged in a counter-clockwise direction to cause thrust surface 43 to exert a downward force on thrust pin 46, thereby moving the carrier pivotally about the fulcrum point afforded by engaged contacts 3 and 4 to lower the shoulder on the bimetal below the latching edge of latch 21. When this occurs, bimetal element 2 is free to move rearwardly along the same path it travels when tripped through electrical overload, and the parts come to rest in the position shown in Figure 2.

Manual relatching of the breaker proceeds in the manner previously described.

From this description, it will be seen that the contact carrier is a free body member controlled only by independent handle fingers and stationary surfaces, and therefore, readily may be made at low cost in the form of a simple stamping to which mechanical connections, except for the attachment of the bimetal and spring, are not required. The assembling operation, therefore, is greatly facilitated.

In the breaker shown, terminal 9 is a screw-type terminal adapted to receive a wire conductor, while terminal 8 is a jaw-type terminal adapted to receive a bus bar type conductor. However, it will be understood that either type of terminal may be used at either location and that the details as to the types of terminal or the manner in which they are mounted forms no part of the present invention. It is significant to note, however, that a single electrical path is furnished between terminals 8 and 9 through pigtail 20, bimetal 2, carrier 1, and contact 3 thereof, thence to stationary contact 4; that is, no second path is available through which electrical current could pass in parallel with the path just described. Hence, the arrangement eliminates uneven current distribution which is encountered in other types of circuit breakers where the current can divide and thereby, in conjunction with the ambient temperature compensator, provides a response which is accurate over prolonged periods of time and under varying ambient temperature conditions.

Having described my invention, I claim:

1. A circuit breaker comprising, a casing having a fixed contact, a releasable carrier mounted in said casing and having a contact member engageable with said fixed contact, spring means biasing said carrier for movement of the contact carried thereby in a direction linearly away from said fixed contact but rotationally toward said fixed contact, a current-responsive releasable latch for restraining movement of said carrier in a direction linearly away from said fixed contact, means associated with said casing independently of said releasable means constituting a fulcrum about which said carrier is rotationally biased when said contacts are in engagement whereby said releasable means is operable independently of said fulcrum means to effect release of said carrier, and a handle for moving said carrier in a direction generally toward said fixed contact to reset said releasable means and restore contact re-engagement under the rotational bias of said spring means, and circuit means within said casing furnishing an electric current path through said releasable means to said contact on said carrier.

2. A circuit breaker comprising, a casing having a fixed contact, a releasable free body carrier mounted in said casing and having a contact member engageable with said fixed contact, cooperable spring and fulcrum means biasing said carrier for movement of the contact carried thereby in a direction laterally away from said fixed contact but rotationally toward said fixed contact when said contacts are in engagement, current-responsive releasable means normally restraining movement of said carrier in a direction laterally away from said fixed contact whereby said releasable means is operable independently of said spring and fulcrum means to effect release of said carrier, a movable handle having means normally out of engagement with said carrier but engageable therewith upon movement of said carrier away from said fixed contact, for returning said carrier in a direction laterally toward said fixed contact to reset said releasable means and restore contact re-engagement under the rotational bias of said spring and fulcrum means, and electric conductor means within said casing furnishing a current path through said releasable means to said contact on said carrier.

3. A circuit breaker comprising, a casing having a fixed contact, a releasable free body carrier mounted in said casing and having a contact member engageable with said fixed contact, cooperable spring and fulcrum means biasing said carrier for movement of the contact carried thereby in a direction laterally away from said fixed contact but rotationally toward said fixed contact when said contacts are in engagement, a current-responsive releasable means normally restraining movement of said carrier in a direction laterally away from said fixed contact whereby said releasable means is operable independently of said spring and fulcrum means to effect release of said carrier, a movable handle having means normally out of engagement with said carrier but engageable therewith upon movement of said carrier away from said fixed contact, for returning said carrier in a direction laterally toward said fixed contact to reset said releasable means and restore contact re-engagement under the rotational bias of said spring and fulcrum means, and electric conductor means within said casing furnishing a current path through said releasable means to said contact on said carrier, said handle having second means independent of said first handle means normally in engagement with said carrier when said contacts are in engagement to move said carrier pivotally about said fixed contact and thereby release said releasable means manually.

4. A circuit breaker comprising, a casing having a fixed contact, a releasable free body carrier mounted in said casing and having a contact member engageable with said fixed contact, cooperable spring and fulcrum means biasing said carrier for movement of the contact carried thereby in a direction laterally away from said fixed contact but rotationally toward said fixed contact when said contacts are in engagement, a current-responsive releasable latch normally restraining movement of said carrier in a direction laterally away from said fixed contact whereby said releasable means is operable independently of said fulcrum means to effect release of said carrier, a movable handle having means normally out of engagement with said carrier but engageable therewith upon movement of said carrier away from said fixed contact, for returning said carrier in a direction toward said fixed contact, to reset said releasable latch and restore contact re-engagement under the rotational bias of said spring and fulcrum means, and electric conductor means within said casing furnishing a single current path through said releasable means to said contact on said carrier.

5. A circuit breaker comprising a casing having a cavity therein, a fixed contact at one end of said cavity, means constituting a fulcrum in said cavity spaced from said fixed contact, a carrier movable generally between said fixed contact and fulcrum, the said carrier at one end having a contact engageable with said fixed contact and being in free pivotal engagement with said fulcrum when said contacts are in engagement, spring means biasing said carrier in a direction generally away from said fixed contact but having engagement with said carrier at a point which is effective to bias the carrier rotationally about said fulcrum to press the carrier contact against the said fixed contact, said carrier having a releasable latch member associated therewith which is normally effective to restrain movement of said carrier in a direction away from said fixed contact, means for releasing said releasable latch member upon occurrence of an overload circuit condition, said casing having a deflector surface engageable by said carrier during movement of said carrier in a direction away from said fixed contact for deflecting said carrier in a lateral path, and a handle movably mounted in said casing and having a portion engageable with said carrier upon deflection thereof for returning said carrier to a position in which said carrier engages said fulcrum, said releasable latch is re-engaged, and the contact on said carrier engages said fixed contact.

6. A circuit breaker comprising a casing having a cavity therein, a fixed contact at one end of said cavity, means constituting a fulcrum in said cavity spaced from said fixed contact, a carrier movable along a path extending generally between said fixed contact and fulcrum, the said carrier having a contact engageable with said fixed contact and residing in free pivotal engagement with said fulcrum when said contacts are in engagement, spring means biasing said carrier in a direction along said path toward said fulcrum but having engagement with said carrier at a point which is effective to bias the end of the carrier having said contact rotationally toward said fixed contact, said carrier having a releasable latch member associated therewith which is normally effective to restrain movement of said carrier, means for releasing said releasable latch member upon occurrence of an overload circuit condition, deflector means engageable by said carrier during movement of the same upon release thereof from said latch for directing said carrier in a path lateral to the line between said fixed contact and fulcrum, a handle movably mounted in said casing and having a portion engageable with said carrier in its deflected position for moving said carrier manually along a different path to the position in which it is relatched and re-engaged with said fulcrum and its contact is re-engaged with said fixed contact.

7. A circuit breaker comprising a casing having a cavity therein, a fixed contact at one end of said cavity, means constituting a fulcrum in said cavity spaced from said fixed contact, a carrier movable generally between said fixed contact and fulcrum, the said carrier having a contact engageable with said fixed contact and having a portion thereof which is spaced from said fixed contact residing in free pivotal engagement with said fulcrum when said contacts are in engagement, spring means biasing said carrier in a direction generally away from said fixed contact but having engagement with said carrier at a point which is effective to bias the carrier rotationally with respect to said fulcrum to establish pressure engagement of the contact on said carrier against said fixed contact, a releasable latch member normally effective to restrain movement of said carrier in a direction away from said fixed contact, means for opening said releasable latch member upon occurrence of an overload circuit condition whereby said carrier is free to move along the line extending between said fixed contact and fulcrum, said casing having a deflector surface engageable by said carrier during such movement for directing at least a portion of said carrier in a path lateral with respect to said line, and a handle mounted in said casing and having a portion engageable with said carrier portion upon lateral deflection of said portion for returning said carrier to a position in which it resides in re-engagement with said fulcrum and releasable latch and its contact re-engages said fixed contact.

8. A casing presenting a fixed contact, a movable handle having a throat and a finger adjacent said throat, a contact carrier movably mounted in said casing adjacent said handle, said contact carrier having a contact engageable with said fixed contact and having a member movable into said throat for engagement by said finger but normally residing out of engagement therewith when said contacts are engaged, means contituting a fulcrum about which said carrier is pivotally movable on an arc passing substantially through said fixed contact, spring means biasing said carrier in a direction away from said fixed contact and rotationally about said fulcrum when said contacts are in engagement, current-responsive releasable means constituting a latch for restraining movement of said carrier in a direction away from said fixed contact, deflector means engageable by said carrier during its movement away from said fixed contact upon release of said releasable means for directing said member of said carrier into the throat of said handle for engagement by said finger thereof, whereby movement of said handle in one direction causes said finger to carry said carrier in a direction generally toward said fixed contact, and means for tripping said carrier member from said finger when the contact of said carrier reaches a position arcuately adjacent said fixed contact and said releasable means is re-engaged with said carrier.

9. A casing presenting a fixed contact, a movable handle having a throat and a finger adjacent said throat, a contact carrier movably mounted in said casing adjacent said handle, said contact carrier having a contact engageable with said fixed contact and having a member movable into said throat for engagement by said finger but normally residing out of engagement therewith when said contacts are engaged, means constituting a fulcrum for said carrier about which the contact on said carrier is pivotally movable on an arc passing substantially through said fixed contact, spring means biasing said carrier in a direction away from said fixed contact and rotationally about said fulcrum when said contacts are in engagement, current-responsive releasable means constituting a latch for restraining movement of said carrier in a direction away from said fixed contact, means constituting a part of said casing engageable by said carrier during its movement away from said fixed contact upon release of said releasable means for directing said carrier in a direction in which the contact thereof is spaced substantially from said fixed contact and in which the said member thereof moves into the throat of said handle for engagement thereby, whereby movement of said handle in one direction causes said finger to carry said carrier in a direction generally toward said fixed contact, and means for tripping said carrier member from said finger when the contact of said carrier reaches a position arcuately adjacent said fixed contact and said releasable means is re-engaged with said carrier 10. A casing presenting a fixed contact, a movable handle having a throat and a finger adjacent said throat, a contact carrier movably mounted in said casing adjcent said handle, said contact carrier having a contact engageable with said fixed contact and having a member movable into said throat for engagement by said finger but normally residing out of engagement therewith when said contacts are engaged, means constituting a fulcrum about which the contact on said carrier is pivotally movable along an arc passing substantially through said fixed contact, spring means biasing said carrier in a direction away from said fixed contact and rotationally about said fulcrum when said contacts are in engagement, current-responsive releasable means constituting a latch for restraining movement of said carrier in a direction away from said fixed contact, deflector means engageable by said carrier during its movement away from said fixed contact upon release of said releasable means for directing said member of said carrier into the throat of said handle for engagement thereby, whereby movement of said handle in one direction causes said finger to move said carrier in a direction generally toward said fixed contact, and cooperable means, including a second member, carried by said handle which is engageable with said carrier and a stop surface on said casing for tripping said carrier member from said finger when the contact of said carrier reaches a position arcuately adjacent said fixed contact and said releasable means is re-engaged with said carrier.

11. A circuit breaker comprising a housing presenting a fixed contact and a stationary fulcrum spaced therefrom, a carrier having at one end a contact engageable with said fixed contact and at the other end a portion pivotally engageable with said fulcrum but movable independently thereof, releasable means responsive to a circuit load associated with said carrier, said releasable means constituting a circuit path through said contacts when they are in engagement, a spring interconnected with said carrier for effecting movement thereof in a direction away from said fixed contact, said releasable means restraining such movement, and the point of engagement of said spring means with said carrier being positioned relative to said fulcrum to effect biasing of the contact on the carrier toward the fixed contact when the two are in engagement, a handle movably mounted on said casing, said handle having a finger normally positioned out of engagement with said carrier but engageable therewith upon movement of said carrier in response to the release of said releasing means, said finger, upon movement of said handle, engaging said carrier and returning the same toward said fixed contact, said finger being constructed to release said carrier therefrom when the carrier has been moved by said finger to a point in which the contact on said carrier is located substantially on an arc having said fulcrum at its center whereby said carrier, when released from said finger, swings arcuately about said fulcrum toward said fixed contact to effect pressure engagement of said contacts.

12. A multi-pole circuit breaker comprising, a plurality of fixed contacts, a plurality of independently movable carriers having surfaces respectively cooperable with said fixed contacts, a fixed latch abutment, current-responsive means fixed to each carrier and having a latch surface engageable with said latch abutment for respectively latching the carrier in a position in which its contact surface engages the fixed contact therefor, means respectively biasing said carriers to positions in which their contact surfaces are spaced from said fixed contacts upon release of said latch surface, and means common to all of said current responsive means of all of said carriers and movably engageable by any carrier upon release thereof for releasing the latch surfaces of all other carriers.

13. A multi-pole circuit breaker comprising, spaced housings each containing a fixed contact, independently movable carriers respectively located in said housings, each carrier having a surface cooperable with the fixed contact in the housing therefor, a latch abutment fixed to said housing, current-responsive means fixed to each carrier and having a latch surface engageable with said latch abutment for latching the carrier thereof in position in which its contact surface engages the fixed contact thereof, means in each housing respectively biasing the carrier therein to a position in which its contact surface is spaced from the fixed contact of said housing upon release of the latching means within said housing, and means pivotally interposed between said housings and having portions respectively extending into adjacent housings in positions to be movably engaged respectively by the carriers within said housings upon release thereof for releasing the latch surface of each current responsive means when any carrier is released.

14. A circuit breaker comprising, a casing presenting a fixed contact, a movable fulcrum member, a latching surface normally spaced from the fulcrum member a predetermined distance, a bodily movable contact carrier having a contact engageable with said fixed contact, a portion engageable with said fulcrum and a current-responsive bimetal element engageable with said latching surface, said current-responsive element residing in engagement with said latching member and said carrier portion residing in engagement with said fulcrum when said contacts are in engagement but being disengageable from said latching surface upon movement thereof in response to current overload, single spring means pivotally urging said carrier about said fulcrum to press said contacts together when said contacts are engaged and for effecting movement of said carrier to a position in which its contact is spaced from said fixed contact and said carrier is spaced from said fulcrum when said bimetal becomes disengaged from said latching surface, and means responsive to ambient temperature for moving said fulcrum through a distance which is equal in amount but opposite in direction to the movement of said bimetal in response to changes in the same ambient temperature, whereby a predetermined point of engagement between said bimetal element and said latching surface is maintained to preserve the sensitivity of the circuit breaker under varying ambient temperature conditions.

15. A circuit breaker comprising, a casing presenting a fixed contact, a bimetal element having one portion relatively fixed and the other portion constituting a fulcrum movable in response to change in ambient temperature, a latching surface normally spaced from the fulcrum a predetermined distance, a bodily movable carrier having a surface engageable with said fixed contact, a portion engageable with said fulcrum, and a current-responsive bimetal member engageable with said latching surface, said current-responsive bimetal member residing in engagement with said latching surface and said carrier portion residing in engagement with said fulcrum when said contact and carrier contact surface are in engagement but said current-responsive bimetal member being disengageable from said latching surface upon movement thereof in response to current overload, single spring means pivotally urging said carrier about said fulcrum to press said contacts together when said contacts are engaged and for effecting movement of said carrier to a position in which its contact surface is spaced from said fixed contact and said carrier is spaced from said fulcrum when said current-responsive member becomes disengaged from said latching surface, the said ambient temperature responsive bimetal element being positioned and arranged to move said fulcrum through a distance which is substantially equal in amount but opposite in direction to the movement of said current-responsive bimetal member in response to changes in the ambient temperature, whereby a predetermined point of engagement between said bimetal element and said latching surface is maintained to preserve the sensitivity of the circuit breaker under varying ambient temperature conditions.

16. A circuit breaker comprising, a casing presenting a fixed contact, a bimetal member having one portion pivotally mounted on said casing and another portion constituting a fulcrum movable in response to change in ambient temperature, a latching surface normally spaced from the fulcrum a predetermined distance, a bodily movable carrier having a surface engageable with said fixed contact, a portion engageable with said fulcrum, and a current-responsive bimetal member engageable with said latching surface, said current-responsive bimetal member residing in engagement with said latching surface and said carrier portion residing in engagement with said fulcrum when said fixed contact and carrier contact surface are in engagement but said current-responsive bimetal member being disengageable from said latching surface in response to current overload, single spring means pivotally urging said carrier about said fulcrum to press said contacts together when said contacts are engaged and for effecting movement of said carrier to a position in which its contact surface is spaced from said fixed contact and said carrier is spaced from said fulcrum when said current-responsive member becomes disengaged from said latching surface, the said ambient temperature responsive bimetal member being constructed to move the fulcrum provided thereby through a distance which is substantially equal in amount but relatively opposite in direction to the movement of said current-responsive bimetal member in response to changes in the ambient temperature, a predetermined point of engagement between said bimetal element and said latching surface is maintained whereby to preserve the sensitivity of the circuit breaker under varying ambient temperature conditions, and a calibrating screw adjustably mounted in said casing for pivotally moving said ambient temperature responsive bimetal to alter the position of said fulcrum with respect to said latching surface and thereby alter the current overload sensitivity of said circuit breaker.

17. A circuit breaker comprising, a casing presenting a fixed contact, a U-shaped bimetal member responsive to change in ambient temperature having one portion relatively fixed and another portion constituting a temperature-movable fulcrum, a latching surface normally spaced from the fulcrum a predetermined distance, a bodily movable carrier having a contact surface engageable with said fixed contact and a portion engageable with said fulcrum, a current-responsive bimetal element engageable with said latching surface for releasably holding said carrier, said current-responsive bimetal member residing in engagement with said latching member and said carrier portion residing in engagement with said fulcrum when said contact and contact surface are in engagement but said current-responsive bimetal member being disengageable from said latching surface in response to current overload, single spring means pivotally urging said carrier about said fulcrum to press said contacts together when said contacts are engaged and for effecting movement of said carrier to a position in which its contact surface is spaced from said fixed contact and said carrier is spaced from said fulcrum when said current-responsive bimetal member becomes disengaged from said latching surface, the said U-shaped bimetal member being constructed to move said fulcrum thereof through a distance which is substantially equal in amount but relatively opposite in direction to the movement of said current-responsive bimetal member in response to changes in the same ambient temperature, whereby a predetermined point of engagement between said bimetal element and said latching surface is maintained to preserve the sensitivity of the circuit breaker under varying ambient temperature conditions.

18. A circuit breaker comprising, a casing having a fixed contact, a stationary fulcrum spaced therefrom, a movable handle, a contact carrier having a contact thereon engageable with said fixed contact and a portion engageable with said fulcrum, current-responsive release means for latching said carrier, said contact carrier being movable to a first position in which its contact engages said fixed contact and its said portion engages said fulcrum, means including a spring connected to said contact carrier for moving the same, upon release of said carrier latching means, to a second position in which the contact on the carrier is spaced from the fixed contact and the said portion of said carrier is separated from said fulcrum, means on said casing for deflecting said contact carrier toward said handle, and means on said handle normally residing out of engagement with said carrier in its first position but engageable with said handle in its deflected second position for relatching said carrier upon movement of said handle in one direction.

19. A circuit breaker comprising, a casing having a fixed contact, a stationary fulcrum spaced therefrom, a movable contact carrier, releasable current-responsive means normally latching said carrier against movement, a movable handle, said contact carrier having a contact thereon engageable with said fixed contact and a portion engageable with said fulcrum, said contact carrier being movable to a first position in which its contact engages said fixed contact and its said portion engages said fulcrum, means including a spring connected to said contact carrier for moving the same, upon release of said releasable latching means, to a second position in which the contact on the carrier is spaced from the fixed contact and the said portion of said carrier is separated from said fulcrum, means on said casing for deflecting said contact carrier toward said handle to a second position during post release movement of said carrier, means on said handle normally out of engagement with said carrier in its first position but engageable with said handle in its deflected position for relatching said carrier upon movement of said handle in one direction, and means on said handle normally in engagement with said handle in its first position for unlatching said carrier upon movement of said handle in an opposite direction.

20. A circuit breaker comprising, a casing presenting a fixed contact and a stationary fulcrum in spaced relation to said fixed contact, a carrier generally in the form of a T, a contact at one end of the head portion of the T, the opposite end of the head portion of the T being engageable with said fulcrum but freely movable therefrom, the head portion of the T normally residing generally between the fixed contact and the fulcrum when the said respective contacts are in engagement and the leg portion of the T extending laterally from the head portion intermediate the fixed contact and fulcrum, spring means exerting upon the leg portion of the T a force generally paralleling the head portion of the T thereby biasing the entire carrier in a direction generally away from the fixed contact but also biasing the contact carrier rotationally about the fulcrum to press the contact of the carrier against the fixed contact when the two are in engagement, current-responsive releasable latch means for normally holding the carrier against movement under the influence of said spring means, a handle movably associated with said case, said handle having a finger normally positioned out of engagement with said carrier but engageable with said carrier when the carrier moves to a released position, said finger, upon movement of said handle, carrying said carrier to a position in which its contact is re-engageable with said fixed contact and in which said releasable means is relatched, and means operable upon further movement of said handle in the same direction for tripping said carrier from said finger to cause pressure re-engagement of the carrier contact with the fixed contact under the rotational bias provided by said spring and fulcrum.

21. A circuit breaker comprising, a housing presenting a fixed electric contact and a stationary, electrically insulative fulcrum spaced from said fixed contact, a carrier having adjacent one end a contact surface engageable with said fixed contact and being pivotally engageable at its other end with said fulcrum but movable independently thereof, said carrier having a portion projecting laterally therefrom intermediate said fixed contact and fulcrum, spring means connected to said laterally projecting portion of said carrier for biasing the same in a direction approximating the direction of a line drawn generally between said fixed contact and fulcrum, releasable latch means normally positioning said carrier against said fulcrum at its one end and its contact surface at the opposite end in alignment with said fixed contact, said latch means being releasable in response to a circuit overload whereby said spring means thereupon effects movement of said carrier to separate its contact surface from said fixed contact, and a handle movably associated with said casing, said handle having a relatching finger normally out of engagement with said carrier when said contact and contact surface are engaged but engageable therewith when the carrier is unlatched, for returning said carrier to latched position in which its one end engages said fulcrum and its contact surface is positioned to move arcuately about said fulcrum for re-engagement with said fixed contact under the bias of said spring means.

22. A multi-pole circuit breaker comprising, a pair of casings each having a stationary contact, a carrier for each stationary contact and having a contact surface engageable therewith, said carriers being movable to positions in which their contact surfaces are out of engagement with said stationary contacts, means for automatically effecting movement of either carrier to a position in which its contact surface is separated from the stationary contact therefor, said means including latchable current-responsive members respectively movable to unlatching positions in event of overload, and a generally T-shaped trip element having oppositely extending portions at the head of the T respectively positioned in the path of movement of each carrier for engagement thereby upon movement thereof and having actuating portions respectively engageable with said latchable members to effect unlatching thereof, the leg of said T-shaped member being pivotally mounted between said casings whereby either carrier of the multi-pole breaker which becomes released through incidence of overload thereon causes pivotal movement of said released carrier and consequent movement of the actuating portions mechanically effects unlatching of the other carrier.

23. A multi-pole circuit breaker comprising, a casing having stationary contacts, a carrier for serving each stationary contact, each carrier having a contact surface engageable therewith, said carriers being movable to positions in which their contact surfaces are out of engagement with said stationary contacts, means for automatically effecting movement of each carrier to a position in which its contact surface is separated from the stationary contact therefor, said means including latchable current-responsive members fixed to said carriers and respectively movable to unlatching positions in event of overload, and a movable trip element having portions respectively positioned in the path of movement of each carrier for engagement thereby upon movement thereof and having portions respectively engageable with said latchable members to effect unlatching thereof, whereby any carrier of the multi-pole breaker which becomes released through incidence of overload therein causes movement of said common trip element in response to the movement of the released carrier and consequent movement of the common trip element mechanically effects unlatching of all other carriers.

24. A circuit breaker comprising, a casing presenting a fixed contact, a stationary fulcrum, and first and second guide surfaces located respectively at opposite sides of a line drawn generally between said fixed contact and stationary fulcrum, a generally T-shaped contact carrier having a contact surface engageable with said fixed contact, a first portion spaced from said contact surface engageable with said stationary fulcrum, a leg portion engageable with one of said guide surfaces and a second head portion engageable with the other of said guide surfaces, the said contact carrier normally residing in a first position in which its contact engages said fixed contact, its head portion engages said fulcrum, and its leg and head portions are spaced respectivelly from said guide surfaces, current releasable means normally latching said carrier against movement from said first position, spring means for effecting movement of said carrier for engagement of the first head portion with said fulcrum and engagement of the leg portion with the first of said guide surfaces upon unlatching of said carrier by said releasable means whereby said contact surface on said carrier disengages the said fixed contact and said carrier is moved to a second position by engagement of said leg portion with the first of said guide surfaces, said handle having a finger normally out of engagement with said contact carrier when it is in its first position but engageable with said contact carrier when it moves to a second position, for carrying said carrier to a position in which its second head portion engages said second guide surface, and means operable upon continued movement of the handle in the same direction for moving said guide member in relation to said second guide surface for tripping said contact carrier from said finger whereby it is restored to said first position.

25. A circuit breaker comprising, a casing presenting a fixed contact, a movable carrier having a contact surface engageable with said fixed contact in a first portion of said carrier, spring means for moving said carrier linearly and rotationally, a current-responsive latch normally opposing linear movement of said carrier, a fulcrum normally opposing rotational movement of said carrier when said contacts are in engagement whereby, upon release of said carrier from said latch, it moves to a second position in which its contact surface is spaced from said fixed contact, said carrier having a relatching member, a handle movably mounted in said casing and having a finger normally spaced from said relatching member when said carrier is in its first position but engageable with said relatching member when the carrier is in its second position, movement of said handle in one direction conveying said carrier in a direction generally toward its first position for relatching the carrier, and means for tripping said relatching member of the carrier from said finger when said carrier reaches a position in which its contact surface is re-engageable with said fixed contact under the rotational force of said spring means.

References Cited in the file of this patent

UNITED STATES PATENTS

| | | |
|---|---|---|
| 2,150,013 | Van Hoorn | Mar. 7, 1939 |
| 2,210,263 | Sachs | Aug. 6, 1940 |
| 2,216,748 | Lindemann | Oct. 8, 1940 |
| 2,421,830 | Cole | June 10, 1947 |
| 2,824,191 | Christensen | Feb. 18, 1958 |